United States Patent [19]
Cross et al.

[11] Patent Number: 4,780,608
[45] Date of Patent: Oct. 25, 1988

[54] LASER SUSTAINED DISCHARGE NOZZLE APPARATUS FOR THE PRODUCTION OF AN INTENSE BEAM OF HIGH KINETIC ENERGY ATOMIC SPECIES

[75] Inventors: Jon B. Cross, Santa Fe; David A. Cremers, Los Alamos, both of N. Mex.

[73] Assignee: The United States of America as represented by the United States Department of Energy, Washington, D.C.

[21] Appl. No.: 150,008

[22] Filed: Jan. 26, 1988

Related U.S. Application Data

[63] Continuation of Ser. No. 89,046, Aug. 24, 1987, abandoned, which is a continuation of Ser. No. 817,934, Jan. 10, 1986, abandoned.

[51] Int. Cl.$^4$ .............................................. B01D 59/44
[52] U.S. Cl. .................... 250/281; 250/288; 250/423 P; 376/122
[58] Field of Search ............... 250/281, 282, 287, 288, 250/423 P; 60/202; 376/103, 104, 122, 144, 145; 315/111.81

[56] References Cited

U.S. PATENT DOCUMENTS 4,365,157 12/1982 Unsöld et al. ................... 250/423 P
4,582,997 4/1986 Jacquot ............................ 250/425

*Primary Examiner*—Bruce C. Anderson
*Attorney, Agent, or Firm*—Samuel M. Freund; Paul D. Gaetjens; Judson R. Hightower

[57] ABSTRACT

Laser sustained discharge apparatus for the production of intense beams of high kinetic energy atomic species. A portion of the plasma resulting from a laser sustained continuous optical discharge which generates energetic atomic species from a gaseous source thereof is expanded through a nozzle into a region of low pressure. The expanded plasma contains a significant concentration of the high kinetic energy atomic species which may be used to investigate the interaction of surfaces therewith. In particular, O-atoms having velocities in excess of 3.5 km/s can be generated for the purpose of studying their interaction with materials in order to develop protective materials for spacecraft which are exposed to such energetic O-atoms during operation in low earth orbit.

16 Claims, 5 Drawing Sheets

LASER SUSTAINED DISCHARGE NOZZLE APPARATUS FOR THE PRODUCTION OF AN INTENSE BEAM OF HIGH KINETIC ENERGY ATOMIC SPECIES

This invention is the result of a contract with the Department of Energy (Contract No. W-7405-ENG-36).

This is a Continuation of application Ser. No. 089,046 filed Aug. 24, 1987 abandoned, which is a continuation of Ser. No. 817,934 filed Jan. 10, 1986, abandoned.

BACKGROUND OF THE INVENTION

The present invention relates generally to a source for generating atomic species and more particularly to a laser sustained discharge atomic beam nozzle source for generating an intense beam of atomic species having high kinetic energy.

Many types of gas discharges are used to excite materials for analysis via atomic emission spectrosocopy. These discharges are produced by electric fields with a range of frequencies: dc arcs (constant fields), ac arcs and sparks (1 kHz or less), inductively coupled plasmas (20–50 MHz), and microwave induced plasmas (about 2.5 GHz). All of these sources require some physical device to support the discharge: arcs and sparks require electrodes, the inductively coupled plasma uses an induction coil, and microwave plasmas employ a resonator or waveguide. Recently, free-standing continuous discharges have been produced by focusing the output of a sufficiently powerful cw-$CO_2$ laser into inert gases, molecular gases and mixtures thereof at atmospheric pressures or above. The discharge resides near the focus of the laser beam independent of any physical support, and does not require a gas flow to stabilize the plasma as do some sources. Because the discharge is maintained by using optical frequencies (30 THz) the plasma is called a "continuous optical discharge" (COD). A review article entitled "Evaluation of the Continuous Optical Discharge for Spectrochemical Analysis," by David A. Cremers, Frederick L. Archuleta, and Ronald J. Martinez. Spectrochimica Acta 40 B, 665 (1985), reivews the characteristics of such discharges as well as the contributions to the scientific literature thereon. Although cw-laser radiation can maintain the continous optical discharge, the output power of such light sources is generally insufficient to initiate the discharge. Consequently, such plasmas can be initiated using conventional electrode sparks or by the spark produced by a focused laser pulse superimposed on the focal volume of the cw-laser beam used to maintain the plasma. The small spark plasma contains a high density of electrons which act as an absorbing center for the cw-laser beam. It is believed that at laser frequencies which are typically above the plasma frequency, absorption occurs mainly via free-free transitions associated with electron-ion collisions (inverse Bremsstrahlung). The temperature of the continuous optical discharge can approach that obtained by sparks (20,000 K. or higher) and is due to the penetration of high frequency optical radiation into the core of the plasma which is typically of the order of 1 mm in diameter. By comparison, at radio and microwave frequencies, which are below the plasma frequency, plasma heating occurs through direct plasma-electric field interactions characterized by much larger absorption coefficients. Consequently, only the outer layers of these plasmas are heated directly by the electric fields. The higher temperature of the continuous optical discharge is also related to its greater operating energy density compared to more conventional discharges.

The continuous optical discharge technique has been combined with a nozzle in "Nozzle Flow In A Laser-Heated Hydrogen Rocket," by Nelson H. Kemp and Robert G. Root, J. Spacecraft 16, 65 (1979). Therein the authors described the use of a continuous optical discharge to provide the energy source to heat a working fluid which then expands through a nozzle, thereby producing thrust in the usual manner for space propulsion. That the gas is heated in bulk by the continuous optical discharge can be seen by FIG. 2 thereof where it is shown that heating is significant approximately 3 cm from the laser throat, and from page 66, column 2, where significant convective losses are discussed. No attention is given to maximizing the output velocity of the atoms produced thereby but rather to maximizing the throughput as is evidenced by the huge laser powers under consideration and the large nozzle radii contemplated (10 kW to 5 MW and 0.93 to 20.8 mm, respectively).

With the advent of space shuttle flights bearing retrievable specimens, a serious chemical etching of the craft's surfaces has been detected along with a pronounced glow near the shuttle surfaces exposed normal to the direction of flight. The glow and etching have been correlated with O-atom density. The intensity of O-atoms in low earth orbit is about $10^{15}$ O-atoms/s-$cm^2$. In order to simulate in-flight conditions in a ground-based facility, an intense source ($>10^{15}$ O-atoms/s-$cm^2$) of O-atoms having a translational velocity of approximately 8 km/s (=5 eV), the velocity of spacecraft in low-earth orbit, is needed. Initial modeling of oxygen etching of space shuttle surfaces has shown that oxidation-resistant coatings need to be developed to increase the operational lifetime of critical components.

Data are needed to model the glow and etching phenomena with the goal of developing such long-lived materials useful for spacecraft in low-earth orbit. Pursuant to this goal, useful data to be obtained from a ground-based O-atom source would consist of angular and recoil-energy distributions for both reflected O-atoms and reaction products, velocities of incident O-atoms, and mass spectra to identify reaction products.

The production of intense high energy, low mass ($<40$ amu) beams is technically difficult. The two principal techniques employed prior to the subject invention use dc arcs and charge exchange, but have a number of disadvantages. Current high intensity dc arc beam sources produce beam velocities of up to 4 km/s and require 8–12 kW of power input. The disadvantages of these devices are the large input energy and cooling requirements, instabilities in the arc due to electrode erosion, reduced O-atom velocities due to boundary layer cooling of the arc, and the high pumping speed requirements for the vacuum system due to the required high gas loads. Charge exchange sources, by contrast, suffer from intensity limitations at energies $<100$ eV because of space charge defocusing. Although attempts to overcome this problem using electron neutralization of the beam have been attempted, such sources are used primarily for producing large beam fluxes at energies greater than 100 eV. Several radio-frequency discharge designs exist for O-atom beam sources, but these produce translational energies of less than 1 eV (1.6 km/s).

Accordingly, it is an object of the subject invention to provide an apparatus for generating a beam of atoms having high kinetic energy.

Another object of the subject invention is to provide an apparatus for generating intense beams of atoms having high kinetic energy.

Yet another object of our invention is to provide an apparatus for investigating the reaction of oxygen atoms having high kinetic energy with a target.

Additional objects, advantages and novel features of the invention will be set forth in the description which follows, and in part will become apparent to those skilled in the art upon examination of the following or may be learned by the practice of the invention. The objects and advantages of the invention may be realized and obtained by means of the instrumentalities and combination particularly pointed out in the appended claims.

SUMMARY OF THE INVENTION

To achieve the foregoing and other objects, and in accordance with the purposes of the present invention, as embodied and broadly described herein, the apparatus of this invention includes means for initiating a plasma in a gas containing the atomic species to be generated either in the form of atoms or molecules containing solely the atom of interest or molecules containing other atoms as well, means for locally sustaining the plasma, whereby the atoms of interest are produced, and means for expanding a portion of the plasma into a region of low pressure. Preferably, the means for initiating the plasma include a pulsed laser having sufficient intentisy to generate a spark in the gas and the means for sustaining the plasma include a continuous output laser. It is also preferred that the pulsed laser is a pulsed $CO_2$ laser and the continuous output laser is a continuous output $CO_2$ laser.

In the further aspect of the present invention and in accordance with its objects and purposes, the apparatus hereof may also include collimating means for forming the atoms from the expanded plasma substantially into a well-defined beam, and means for analyzing products generated from the interaction of the beam of atoms with a target.

Benefits and advantages of our invention include the ability to generate an intense beam of atoms having high kinetic energy without having to heat a large volume of gas to very high temperatures. Only the gas which is expanded through the nozzle of the subject invention into a region of low pressure is heated. Additionally, since well-defined beams of the atoms of interest can be generated, investigations of the interaction of surfaces with specific atoms or molecules may be investigated by mass spectrometric analysis or other means. Long periods of operation are obtainable since the interaction of the high temperature plasma with the nozzle surfaces can be minimized. In addition, the hot plasma is initiated and sustained using focused laser radiation sources independent of any physical device in the region of the plasma such as a pair of electrodes which degrade in time due to the action of the hot plasma gases and may contaminate the atomic beam.

Moreover, since the cw-laser beam sustaining the discharge can be sharply focused, and due to the small size of the continuous optical discharge ($\sim 1$ mm diameter) the plasma can be located in the nozzle very close to the low pressure region, thereby, permitting the attainment of very high translational velocities. A plasma generated by electrodes, by contrast, can not be formed in such a small diameter nozzle.

BRIEF DESCRIPTION OF THE DRAWINGS

The accompanying drawings, which are incorporated in and form a part of the specification, illustrate one embodiment of the present invention and, together with the description, serve to explain the principles of the invention. In the drawings.

DETAILED DESCRIPTION OF THE INVENTION

Figure 1:
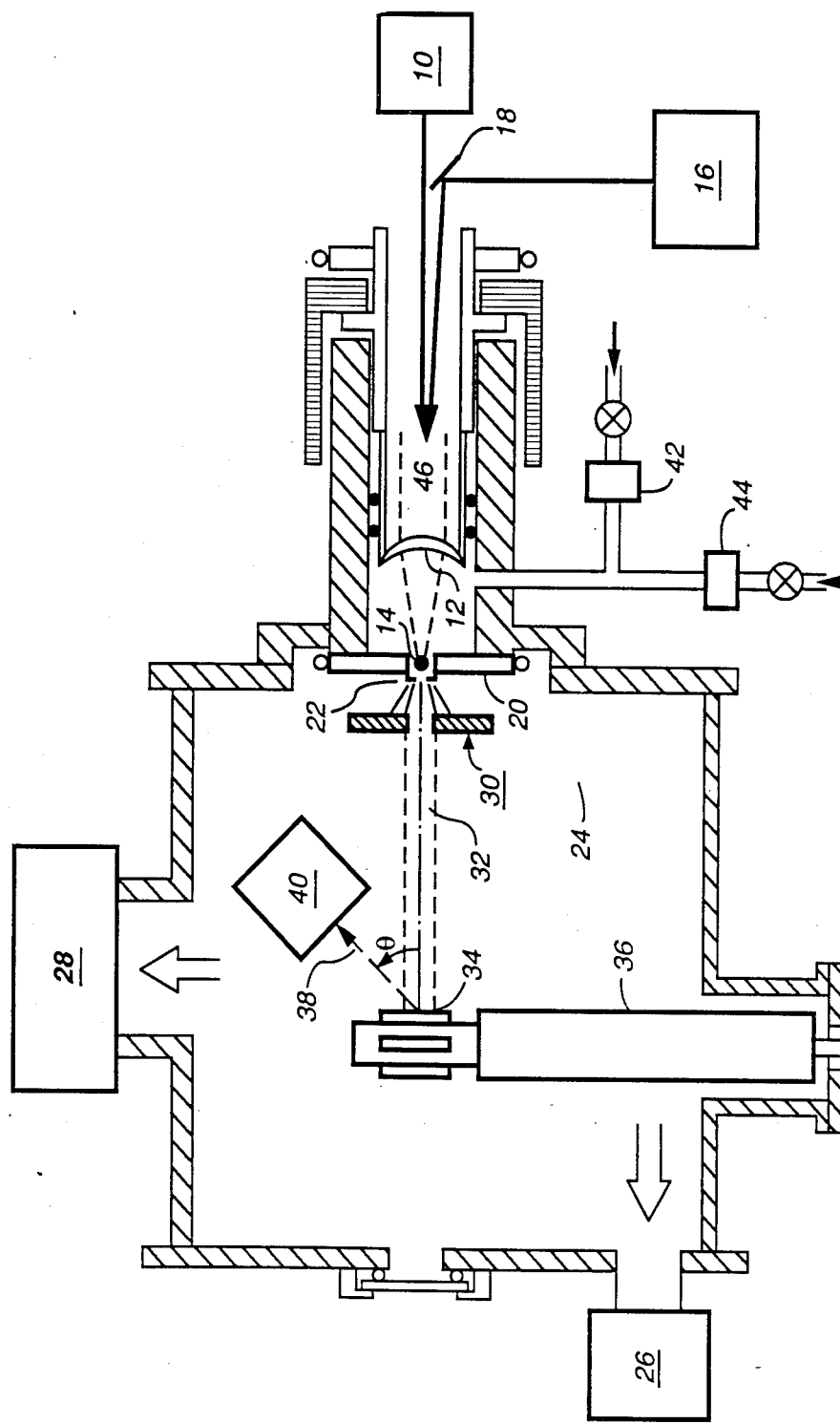
FIG. 1 is a schematic representation of the laser sustained discharge nozzle source showing a pulsed TEA $CO_2$ initiator laser beam, which is made approximately colinear with a cw-$CO_2$ sustainer laser beam, in order to initiate the continuous optical discharge. Shown also is a movable focusing lens which is adjusted to position the discharge in the throat of the nozzle after the continuous optical discharge is operating stably.

Reference will now be made in detail to the present preferred embodiment of the invention, an example of which is illustrated in the accompanying drawings. Briefly, our invention includes an apparatus for the generation of a high intensity beam of oxygen atoms having high kinetic energy. Mixtures of oxygen molecules and a noble gas are subjected to intense cw-$CO_2$ laser radiation, and, after a discharge is initiated by means of electrodes or a focused, pulsed $CO_2$ laser beam, a portion of the resulting continuous plasma is expanded through a nozzle into a region of low pressure. One of the unique features of the current invention derives from sustaining the continuous optical discharge in the throat of the hydrodynamic expansion nozzle and then skimming the resulting tail flame to extract high velocity atom species in the form of an atomic beam. Translational temperatures as high as 8,500 K. for a xenon atomic beam have been observed with Mach numbers between 5 and 17. Direct spectroscopic measurements on a continuous optical discharge produced in xenon show that the plasma is characterized by a temperature of 9,600–10,400 K. indicating that a significant fraction of the energy deposited in the discharge by the cw-laser is transferred to the atomic beam. This result is in direct contrast to the operation of the nozzle device of Kemp and Root, supra, where expected energy losses due to convection provide a substantial decrease in the amount of energy transferred to the hot exhaust gases in their calculated rocket engine. An O-atom velocity of approximately 3.5 km/s has been observed from an argon/oxygen mixture. Calculations show that a continuous optical discharge produced in a helium/oxygen mixture at 8,500 K. would yield an O-atom velocity of approximately 8.3 km/s. There is evidence that the temperature of a continuous optical discharge in helium would exceed 8,500 K., possibly attaining 30,000 K., which would yield a maximum O-atom velocity of approximately 15.6 km/s. It should be mentioned that the O-atom velocity is approximately equal to that of the expanded noble gas for small (up to ~40% of $O_2$) amounts of oxygen added to the continuous optical discharge of the noble gas, although some reduction in translational velocity is observed as the concentration of oxygen is increased. The oxygen atoms generated according to the teachings of the subject invention are formed into an atomic beam and are directed at various targets of interest and the reaction products and scattered O-atoms emerging from these targets are studied as a function of angle defined by the incoming O-atom beam using mass spectrometry. It would be obvious to one of ordinary skill in the art after having carefully studied the teachings of the subject invention, that other gases bearing the atomic species for which it is desired to generate high energy atomic beams may be employed. Similarly, other forms of plasma initiation may be used. For example, a high voltage electric discharge has been shown to be useful for this purpose. Its major drawback lies in the rapid destruction of such electrodes by the powerful cw-$CO_2$ laser beam. It is therefore preferred that plasma initiation and maintenance is best performed free of any physical structure. Moreover, lasers other than carbon dioxide may be used for the initiation and the sustaining of the continous optical discharge plasma. For example, a Nd-YAG laser has been used for the initiation step. Carbon dioxide lasers have been used since the output therefrom is readily absorbed by plasmas and they are available with very high power in both pulsed and cw operating modes. Moreover, laser heating of a plasma via the inverse Bremsstrahlung process varies as $\lambda^2$, so that cw-laser sources having shorter wavelengths such as Nd:Yag, for example, are absorbed less effectively, and would require substantially greater cw-laser output power levels to sustain the plasma. The following Table lists a representative sample of operating conditions for the continuous optical discharge nozzle source using different pure gases and gas mixtures.

Turning now to FIG. 1, light from a high power cw laser 10 is focused by lens 12, into a region 14 in an appropriate gas mixture in which a continuous optical discharge is to be generated. Light from a pulsed laser 16 is directed by beam mirror 18 though lens 12, by which it is likewise focused into substantially the same volume 14 as is the light from the cw-laser 10. The continuous optical discharge in region 14 is then expanded through a nozzle 20 having a throat 22 into a low pressure region 24 pumped by a forepump 26 and a high-throughput, low pressure vacuum pump 28. The position of the continuous optical discharge may be altered by changing the position of lens 12. Skinner means 30 collimates the emerging atoms into a well-deinfed atomic beam 32 which impinges upon a target sample 34 supported by a rotatable sample holder 36. Reaction products 38 from the interaction of the energetic atomic beam 32 and sample 34 and non-reactively scattered O-atoms are analyzed by analyzer 40 at various angles, $\lambda$, defined as the angle between the energetic atomic beam 32 and the path 38 of the interaction products to be analyzed. The flowing gas mixture in which the continuous optical discharge is generated is mixed using flow controllers 42 and 44.

TABLE

| | Typical Operating Parameters for the Laser Sustained Continuous Optical Discharge Nozzle Apparatus | | | |
|---|---|---|---|---|
| gas | laser power (W) | gas pressure (psi) | velocity (species) (km/s) | % $O_2$ (%) |
| Pure Xe | 25 | 30 | 1.5 (Xe) | — |
| Xe + $O_2$ | 65 | 30 | 1.5 (O—atoms) | ~5 |
| Pure Ar | 250 | 40 | 4.2 (Ar) | — |
| Ar + $O_2$ | 600 | 40 | 3.5 (O—atoms)[a] | 50 |
| Pure Ne | 1300 | 120 | 6.9 (Ne) | — |
| He + $O_2$[b] | >1300 | >120 | 8.3–15.6 (O—atoms) | <50 |

[a]Addition of large amounts of $O_2$ to the continuous optical discharge produces a slight reduction in the plasma temperature resulting in a lower velocity of the atomic species.
[b]Predicted, based on work with other inert gases.

Figure 2:
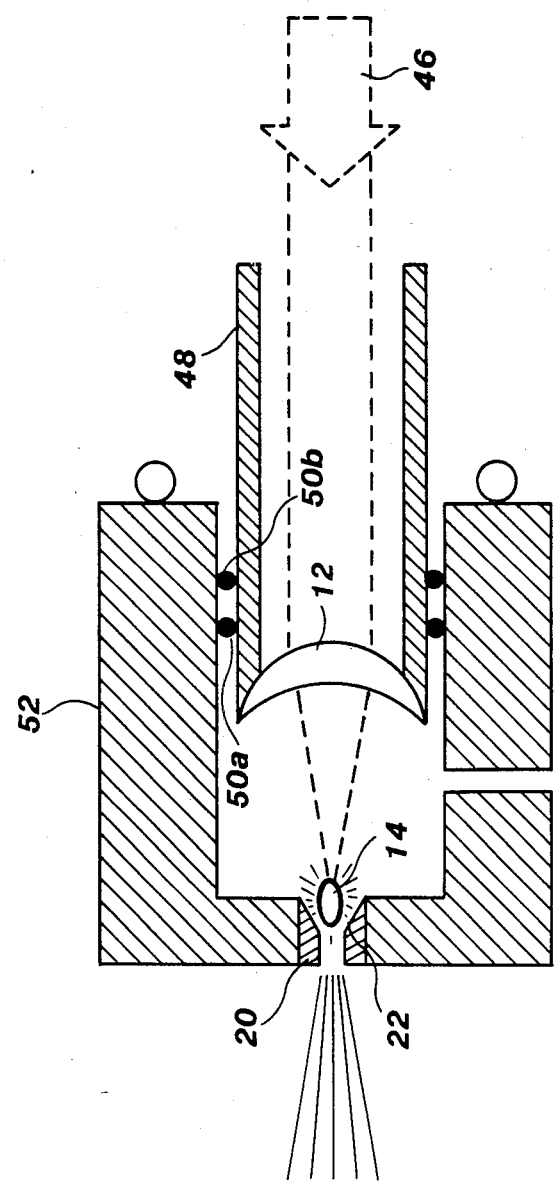
FIG. 2 shows an expanded schematic representation of the nozzle and the movable focusing lens for the subject invention.

FIG. 2 shows an enlarged and simplified view of the laser sustained discharge nozzle source. The substantially colinear pulsed initiating laser radiation and the cw sustaining laser radiation 46 impinge upon a ZnSe lens 12 and are focused into the continuous optical discharge region 14. A lens holder 48 is provided to translate the ZnSe lens along the path of the laser radiation in order to position the plasma discharge 14 in the throat 22 of the nozzle 20. The plasma is initiated away from the throat of the nozzle and then moved into the nozzle. O-ring seals 50a, b provide a gas-tight fitting for the lens holder in the nozzle enclosure 52. As mentioned hereinabove, the plasma may be initiated by means of high voltage electrodes placed near to the nozzle. However, this method of initiation was found to be unacceptable because of the rapid deterioration of the electrodes under the action of the high intensity cw-$CO_2$ laser output.

Figure 3:
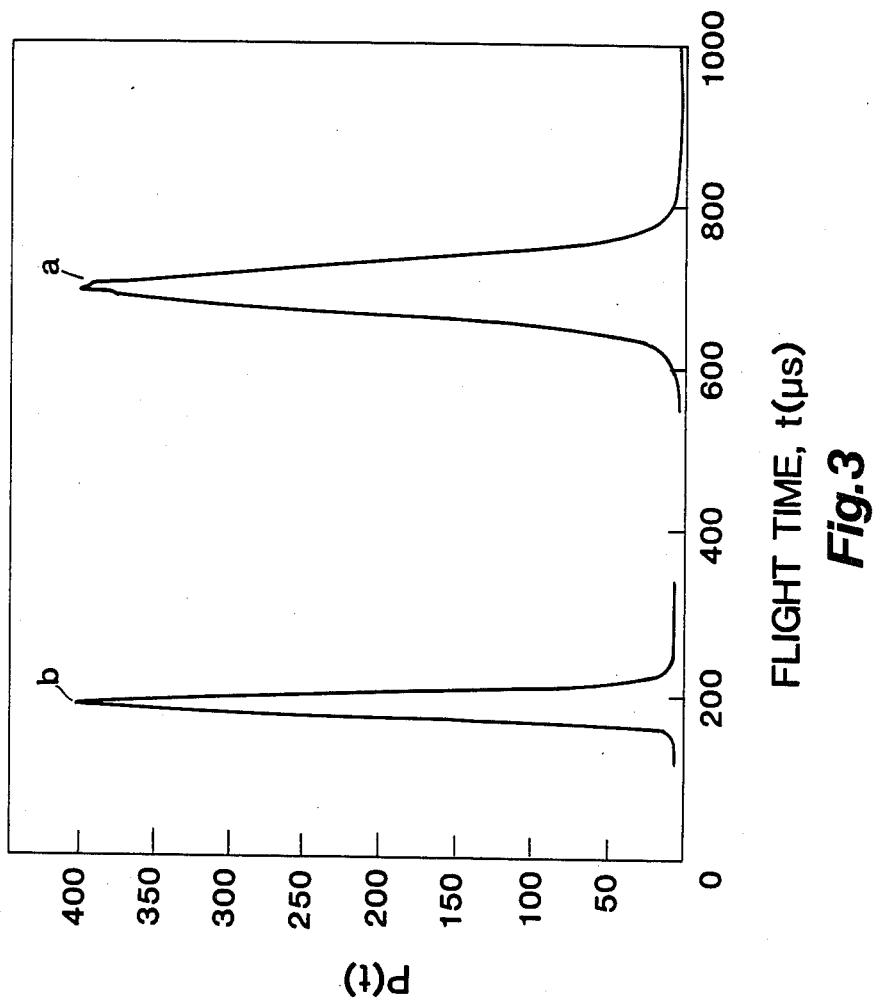
FIG. 3 shows xenon time-of-flight spectra obtained under two distinct operating conditions. Curve (a) was taken with the continuous optical discharge off and the cw-$CO_2$ laser off, with 200 torr of xenon and with a room temperature nozzle. Curve (b) was obtained under the same conditions, but with the continuous optical discharge operating under the action of a cw-$CO_2$ laser having an output adjusted to 60 W and a ZnSe lens positioned to locate the focal volume of the discharge in the throat of the nozzle.

FIG. 3 shows time-of-flight spectra for xenon gas expanded through a nozzle having a diameter of 0.1 mm. The ordinate P(t) represents the relative intensity of the detected atoms. Curve (a) was taken in the absence of a continuous optical discharge, with the cw-$CO_2$ laser off and with 200 torr of xenon expanded though a room temperature nozzle. Time-of-flight curve (b) was obtained under the same conditions, but with the continuous optical discharge on with the cw-$CO_2$ laser output adjusted to about 60 W, and the ZnSe lens positioned to place the continuous optical discharge in the throat of the nozzle.

Figure 4:
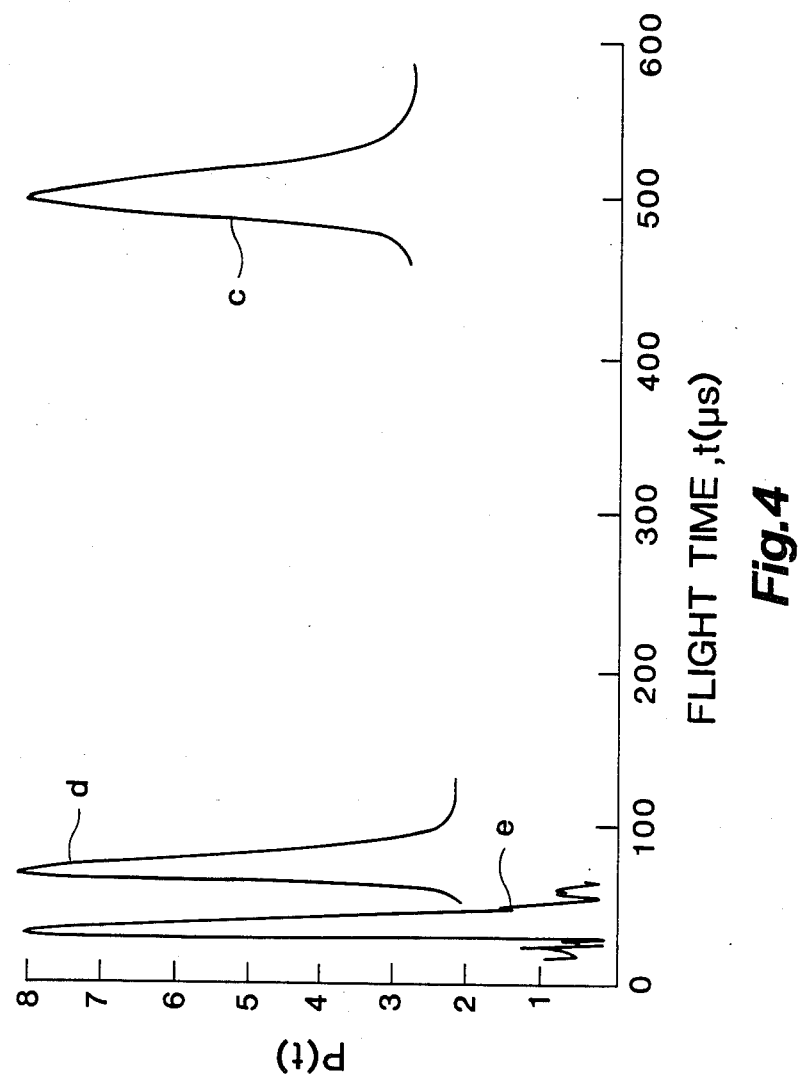
FIG. 4 shows time-of-flight distributions for two rare gases (c) argon with the continuous optical discharge off and the cw-$CO_2$ laser off; (d) argon with the continuous optical discharge on and the plasma positioned in the throat of the nozzle and (e), neon with the continuous optical discharge on and the plasma positioned a short distance from the throat of the nozzle in the high pressure region.

FIG. 4 shows time-of-flight distributions for two rare gases (c) argon with the continuous optical discharge off and the cw-$CO_2$ laser off; (d) argon with the continuous optical discharge on and the plasma positioned in the throat of the nozzle and (e), neon with the continuous optical discharge on and the plasma positioned a short distance from the throat of the nozzle. The velocities with the continuous optical discharge operating were 4.2 and 6.9 km/s, respectively, for Ar and Ne.

Figure 5:
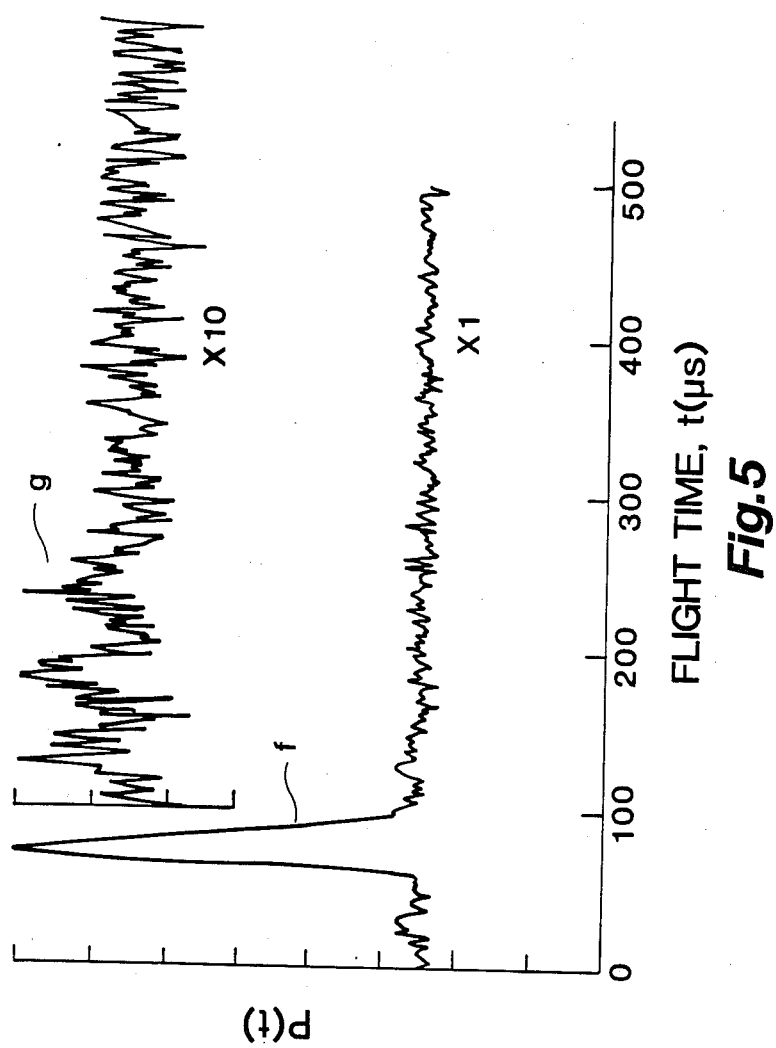
FIG. 5 shows time-of-flight distributions for O-atoms (f) and for $O_2$ (g) with a 40% $O_2$-60% argon mixture. The O-atom velocity is approximately 3.5 km/s with near 100% dissociation of the $O_2$ into O-atoms as indicated by a near absence of $O_2$ signal.

FIG. 5 shows the time-of-flight distribution of O-atoms (f) with a 40% $O_2$-60% argon mixture. The O- atom velocity is approximately 3.5 km/s with near 100% dissociation of the $O_2$ into O-atoms. It was found that 99% of the oxygen molecules were dissociated with this mixture of oxygen in argon as may be seen from the near absence of a mass 32 peak in curve (g). The O-atom flux at a sample surface 20 cm from the nozzle and downstream from the skinner means was found to be approximately $2 \times 10^{17}$/s-cm$^2$. It was also determined that the plasma was more readily initiated in the flowing noble gas, with oxygen added subsequently, once the plasma was operating stably. However, it is likely that the plasma will be initiated more easily for oxygen/helium mixtures with the oxygen present.

Experiments have shown that a small decrease in the distance between the continuous optical discharge and the nozzle at short distances produces a large increase in the effective beam temperature. At the shortest distance, the continuous optical discharge could be seen protruding through the nozzle into the low pressure downstream side of the nozzle. At yet shorter distances, the discharge was extinguished due to operation in a low pressure region of the nozzle and the inability to increase the laser power above a maximum operating limit.

The cw-$CO_2$ laser sustained discharge atomic beam nozzle source has produced neon velocities of approximately 7 km/s in pure neon gas having beam intensities greater than $10^{17}$ neon atoms/s-cm$^2$ with the continuous optical discharge a short distance from the nozzle throat. Again the beam intensity was measured 20 cm away from the nozzle and downstream from the skimmer means. By adding oxygen to the pure neon gas and moving the continuous optical discharge closer to the nozzle, it should be possible to produce a high intensity beam of O-atoms having a velocity of at least 8 km/s. Further, from the time-of-flight information for oxygen-xenon and oxygen-argon mixtures and the expected high temperature of the helium plasma, it can be predicted that the present apparatus can provide O-atom velocities between 8.3 and 15.6 km/s for oxygen-helium mixtures.

In conclusion, the subject invention provides a method for generating a high intensity beam of high kinetic energy atoms by expansion of a portion of a plasma through a nozzle into a region of low pressure without having to thermally heat the entire gas volume behind the nozzle and the entire nozzle itself to extremely high temperatures.

The foregoing description of one preferred embodiment of the invention has been presented for purposes of illustration and description. It is not intended to be exhaustive or to limit the invention to the precise form disclosed, and obviously many modifications and variations are possible in light of the above teaching. For example, other gases than oxygen may be used to generate atomic beams of other elements of interest. Moreover, lasers other than carbon dioxide may be used to initiate and sustain the continuous optical discharge, the choice being related to the absorption of the laser radiation by the plasma. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What we claim is:

1. Apparatus for generating a beam of atoms having high kinetic energy, comprising:
   a. means for initiating a plasma in a gas containing the atoms;
   b. nozzle means defining a throat portion for accelerating and expanding a portion of the plasma into a region of low pressure;
   c. continuous output laser means; and
   d. first focusing means for focusing the laser in a volume adjacent the nozzle throat to sustain the plasma in the focus volume effective to produce energetic atoms for accelerating through the nozzle.

2. Apparatus according to claim 1, wherein the plasma initiation means includes a pulsed laser and second focusing means for focusing the output of said pulsed laser into the gas adjacent the nozzle means for generating a spark in the gas from the interaction of the focused output of the pulsed laser with the gas.

3. Apparatus according to claim 1, wherein the continuous laser is a continuous output carbon dioxide laser.

4. Apparatus according to claim 3, where the gas for plasma production comprises oxygen and a noble gas selected from the group consisting of helium, neon, argon, krypton, and xenon.

5. Apparatus for investigating the reactions of oxygen atoms having high kinetic energy with a target, comprising:
   a. means for initiating a plasma in a gas containing oxygen;
   b. nozzle means defining a throat portion for accelerating and expanding a portion of the plasma into a region of low pressure;
   c. continuous output laser means;
   d. first focusing means for focusing the laser in a volume adjacent the nozzle throat to sustain the plasma in the focus volume effective to produce energetic atoms for accelerating through the nozzle;
   e. collimating means for forming the oxygen atoms from the expanded plasma into a substantially well-defined beam; and
   f. means for analyzing products generated from the interaction of the beam of oxygen atoms with the target.

6. Apparatus according to claim 5, wherein the plasma initiation means includes a pulsed laser, said apparatus further comprising means for focusing the output of the pulsed laser adjacent the nozzle means to generate a spark in the gas from the interaction of the focused output of the pulsed laser with the gas.

7. Apparatus according to claim 5, wherein the gas in which the plasma is produced comprises oxygen and a noble gas selected from the group consisting of helium, argon, krypton, and xenon.

8. Apparatus according to claim 7, wherein the product analyzing means includes a mass spectrometer and means for measuring time-of-flight.

9. Apparatus for generating a beam of atoms having high kinetic energy, comprising:
   a. means for initiating a plasma in a gas selected from the group consisting of helium, neon, argon, krypton, and xenon;
   b. nozzle means defining a throat portion for accelerating and expanding a portion of the plasma into a region of low pressure;
   c. continuous output laser means;

d. first focusing means for focusing the laser in a volume adjacent the nozzle throat to sustain the plasma in the focus volume effective to produce energetic atoms for accelerating through the nozzle; and e. means for introducing a gas containing the atoms into the plasma for producing energetic atoms.

10. Apparatus according to claim 9, wherein the plasma initiation means includes a pulsed laser and second focusing means for focusing the output of the pulsed laser into the gas adjacent the nozzle for generating a spark in the gas from the interaction of the focused output of the pulsed laser with the gas.

11. Apparatus according to claim 9, wherein the continuous output laser is a continuous output carbon dioxide laser.

12. Apparatus for investigating the reactions of oxygen atoms having high kinetic energy with a target, comprising:

a. means for initiating a plasma in a gas selected from the group consisting of helium, argon, krypton, and xenon;

b. nozzle means defining a throat portion for accelerating and expanding a portion of the plasma into a region of low pressure;

c. continuous output laser means;

d. first focusing means for focusing the laser in a volume adjacent the nozzle throat to sustain the plasma in the focus volume effective to produce energetic atoms for accelerating through the nozzle;

e. means for introducing oxygen gas into the plasma to produce energetic oxygen atoms;

f. collimating means for forming the oxygen atoms from the expanded plasma into a substantially well-defined beam; and g. means for analyzing products generated from the interaction of the beam of oxygen atoms with the target.

13. Apparatus according to claim 13, wherein the plasma initiation means includes a pulsed laser, said apparatus further comprising second focusing means for focusing the output from the pulsed laser adjacent the throat of the nozzle means to generate a spark from the interaction of the focused output of the pulsed laser with the gas.

14. Apparatus according to claim 13, wherein the continuous output laser is a continuous output carbon dioxide laser.

15. Apparatus according to claim 14, wherein the gas in which the plasma is produced comprises oxygen and a noble gas selected from the group consisting of helium, neon, argon, krypton, and xenon.

16. Apparatus according to claim 15, wherein the product analyzing means includes a mass spectrometer and means for measuring time-of-flight.

* * * * *